US012731776B2

(12) United States Patent
Phares et al.

(10) Patent No.: US 12,731,776 B2
(45) Date of Patent: Sep. 8, 2026

(54) PROCESSES FOR THE MANUFACTURE OF CONDUCTIVE PARTICLE FILMS FOR LITHIUM ION BATTERIES AND LITHIUM ION BATTERIES

(71) Applicant: Dragonfly Energy Corp., Reno, NV (US)

(72) Inventors: Denis Phares, Reno, NV (US); Justin S. Ferranto, Reno, NV (US)

(73) Assignee: Dragonfly Energy Corp., Reno, NV (US)

( * ) Notice: Subject to any disclaimer, the term of this patent is extended or adjusted under 35 U.S.C. 154(b) by 131 days.

(21) Appl. No.: 18/604,688

(22) Filed: Mar. 14, 2024

(65) Prior Publication Data

US 2024/0222596 A1 Jul. 4, 2024

Related U.S. Application Data

(60) Continuation of application No. 17/123,353, filed on Dec. 16, 2020, now Pat. No. 11,967,696, which is a (Continued)

(51) Int. Cl.
*H01M 4/04* (2006.01)
*B05B 5/053* (2006.01)
(Continued)

(52) U.S. Cl.
CPC ......... *H01M 4/0419* (2013.01); *B05B 5/0533* (2013.01); *B05B 5/087* (2013.01); (Continued)

(58) Field of Classification Search
CPC .................................................... B05D 3/0254
See application file for complete search history.

(56) References Cited

U.S. PATENT DOCUMENTS 1,657,643 A * 1/1928 Reniers ................ H05B 3/0009 219/155
4,115,685 A 9/1978 Grandin et al.
(Continued)

FOREIGN PATENT DOCUMENTS

| CN | 1377989 A | 11/2002 |
|---|---|---|
| CN | 1754237 A | 3/2006 |
| CN | 104046963 A | 9/2014 |

OTHER PUBLICATIONS

International Search Report and Written Opinion for International Application No. PCT/US2015/057299, mailed Feb. 12, 2016.
(Continued)

*Primary Examiner* — Alex A Rolland
(74) *Attorney, Agent, or Firm* — Wolf, Greenfield & Sacks, P.C.

(57) ABSTRACT

The invention is directed to a process for forming a particle film on a substrate. Preferably, a series of corona guns, staggered to optimize film thickness uniformity, are oriented on both sides of a slowly translating grounded substrate (copper or aluminum for the anode or cathode, respectively). The substrate is preferably slightly heated to induce binder flow, and passed through a set of hot rollers that further induce melting and improve film uniformity. The sheeting is collected on a roll or can be combined in-situ and rolled into a single-cell battery. The invention is also directed to products formed by the processes of the invention and, in particular, batteries.

15 Claims, 5 Drawing Sheets

Related U.S. Application Data division of application No. 15/521,975, filed as application No. PCT/US2015/057299 on Oct. 26, 2015, now Pat. No. 10,897,037.

(60) Provisional application No. 62/068,830, filed on Oct. 27, 2014.

(51) Int. Cl.

| | |
|---|---|
| ***B05B 5/08*** | (2006.01) |
| ***B05B 5/14*** | (2006.01) |
| ***B05B 5/16*** | (2006.01) |
| ***B05D 1/06*** | (2006.01) |
| ***B05D 3/02*** | (2006.01) |
| ***H01M 4/13*** | (2010.01) |
| ***H01M 4/139*** | (2010.01) |

(52) U.S. Cl.

CPC .............. *B05B 5/14* (2013.01); *B05B 5/1608* (2013.01); *B05D 1/06* (2013.01); *B05D 3/0254* (2013.01); *H01M 4/0435* (2013.01); *H01M 4/13* (2013.01); *H01M 4/139* (2013.01)

(56) References Cited

U.S. PATENT DOCUMENTS

| | | | |
|---|---|---|---|
| 4,457,256 | A | 7/1984 | Kisler et al. |
| 4,582,098 | A | 4/1986 | Matsumoto et al. |
| 5,622,313 | A | 4/1997 | Lader et al. |
| 5,989,747 | A | 11/1999 | Tanaka et al. |
| 6,234,225 | B1 | 5/2001 | Tanaka et al. |
| 6,511,517 | B1 | 1/2003 | Ullrich et al. |
| 7,722,687 | B2 | 5/2010 | Hampden-Smith et al. |
| 8,927,068 | B2 | 1/2015 | Brown et al. |
| 10,897,037 | B2 | 1/2021 | Phares et al. |
| 11,967,696 | B2 | 4/2024 | Phares et al. |
| 2003/0096154 | A1 | 5/2003 | Yasumoto et al. |
| 2005/0241137 | A1 | 11/2005 | Suzuki |
| 2006/0153972 | A1 | 7/2006 | Hirokawa |
| 2006/0172179 | A1 | 8/2006 | Gu et al. |
| 2008/0089013 | A1 | 4/2008 | Zhong et al. |
| 2009/0130564 | A1 | 5/2009 | Shembel |
| 2011/0135836 | A1 | 6/2011 | Hays et al. |
| 2012/0064225 | A1 | 3/2012 | Bachrach et al. |
| 2012/0214040 | A1 | 8/2012 | Tsutsumi et al. |
| 2012/0251878 | A1 | 10/2012 | Ueki et al. |
| 2013/0017340 | A1 | 1/2013 | Brown et al. |
| 2013/0273407 | A1 | 10/2013 | Kylyvnyk et al. |
| 2013/0309414 | A1* | 11/2013 | Eskra .................... H01M 4/625 427/126.6 |
| 2013/0323583 | A1 | 12/2013 | Phares |
| 2014/0033976 | A1 | 2/2014 | Sferlazzo |
| 2015/0372286 | A1 | 12/2015 | Bolandi et al. |
| 2017/0331100 | A1 | 11/2017 | Phares et al. |
| 2021/0104722 | A1 | 4/2021 | Phares et al. |

OTHER PUBLICATIONS

Decision on Appeal for U.S. Appl. No. 13/905,730, mailed Jun. 24, 2019.

Bailey, The Science and Technology of Electrostatic Powder Spraying, Transport and Coating. Journal of Electrostatics. 1998; 45:85-120.

Chen et al., Electrostatic spray deposition of thin layers of cathode materials for lithium battery. Solid State Ionics. 1996;86-88:1301-1306.

Matsuda et al., Modeling for Size Reduction of Agglomerates in Nanoparticle Fluidization. American Institute of Chemical Engineers. Nov. 2004;50(11):2763-2771.

Mazor et al., Electrophoretic deposition of lithium iron phosphate cathode for thin-film 3D-microbatteries. Journal of Power Sources. 2012; 198:264-272.

Seshadri et al., Performance of a Slit Virtual Impactor Operated at High Particle Mass Loading. Journal of Aerosol Science. 2005;36:541-547.

Zhu et al., Sound Assisted Fluidization of Nanoparticle Agglomerates. Powder Technology. 2004; 141;119-123.

* cited by examiner

PROCESSES FOR THE MANUFACTURE OF CONDUCTIVE PARTICLE FILMS FOR LITHIUM ION BATTERIES AND LITHIUM ION BATTERIES

CROSS-REFERENCE TO RELATED APPLICATIONS

This Application is a Continuation of U.S. application Ser. No. 17/123,353, filed on Dec. 16, 2020, which is a Division of U.S. application Ser. No. 15/521,975, filed on Apr. 26, 2017, which is a National Stage filing under 35 U.S.C. § 371 of International Application Serial No. PCT/US2015/057299, filed on Oct. 26, 2015, which claims the benefit under 35 U.S.C. § 119 (e) to U.S. Provisional Application Ser. No. 62/068,830, filed on Oct. 27, 2014. The entire contents of these applications are incorporated herein by reference in their entirety.

BACKGROUND

1. Field of the Invention

This invention is directed to conductive particle films and to methods for the manufacture of conductive particle films such as by electrostatic deposition.

2. Description of the Background

Although a significant amount of research has been done on developing new battery materials—especially lithium ion intercalation materials—film deposition methodologies have remained relatively unchanged. Once anode or cathode powder materials are acquired, conventional deposition involves the production of a slurry that contains the appropriate mixture of intercalation, conduction, and binder particles. The slurry is then coated onto the suitable electrode metal sheeting, which is subsequently heated for solvent evaporation and transferred into a controlled atmosphere for assembly into battery. This multiple step process is time consuming, costly, and sufficiently labor intensive that outsourcing production is a necessity for long-term financial viability. Only a few other methods have been investigated as potential replacements for the slurry coating process for lithium ion batteries. Some of these are relatively expensive, such as pulsed laser deposition, vapor deposition, and sputtering. Other more economically feasible options include electrostatic spray deposition (ESD) (C. H. Chen et al., Solid State Ionics 86: 1301-1306, 1996.), and electrophoretic deposition (EPD) (H. Mazor et al., J. Power Sources 198: 264-272, 2012). These methods include a liquid phase, thereby ensuring a multistep method. ESD involves electrostatic deposition of charged precursor solution droplets that impinge and react on a hot, grounded substrate. EPD involves the migration of charged particles onto a grounded substrate in a liquid.

Less time consuming and labor intensive methods would be desired for the production of particle films for batteries and other products.

Thermal runaway is one of the biggest dangers of the lithium ion battery. At a certain temperature, a self-sustaining reaction will occur, leading to catastrophic failure. Although some battery chemistries require higher temperatures to initiate thermal runaway, it is possible for all lithium batteries.

Lithium batteries will generate heat due to the chemical reaction between anode and cathode, and internal electrical resistance. If the heat generation is equal to the heat flux out of the battery, then there will be no rise in temperature.

In a standard lithium ion cylindrical cell as shown in FIG. 7, the metal foils are connected to the battery terminals by a small tab. This tab is sufficient for the current to pass through, but provides a poor conduit for heat flow. Further, for heat to be transferred through the tab, it must spiral outward through the entire battery. This means that the heat must travel through meters of foil in order to cross centimeters of space. In order for heat to transfer radially, it must pass through thermally resistive layers of anode powder, polymer separator, and cathode powder.

SUMMARY OF THE INVENTION

The present invention overcomes the problems and disadvantages associated with current strategies and designs, and provides new tools and methods for forming particle films.

One embodiment of the invention is directed to a process for forming a particle film. The process preferably comprises co-aerosolizing conductive particles and a binder, applying charge to the aerosolized particle mixture by a corona; and applying the mixture to a heated substrate, preferably by aerodynamic or electrostatic forces, forming a film. Preferably the conductive particles comprise anodic or cathodic material and the anodic or cathodic material comprises carbon, a lithium metal phosphate, or a lithium metal oxide. Preferably applying the mixture comprises a reel-to-reel deposition system wherein particles are deposited in a single stream or multiple streams.

Another embodiment of the invention is a particle film deposited by the method of the invention and preferably which is a component of a lithium-ion battery.

Another embodiment of the invention is directed to a process for forming a conductive particle film. The process comprises mixing conductive particles with a binder to form a mixture, aerosolizing the mixture, applying a charge to the aerosol mixture, applying heat to a grounded substrate, and applying the mixture to the heated and grounded substrate by aerodynamic or electrostatic interaction, forming the conductive particle film.

Preferably, the substrate is a metal foil heated above the melting point of the binder by resistive, convective, or radiative heating. In a preferred embodiment, the conductive particles comprise anodic or cathodic material. Preferably, the anodic or cathodic material comprises at least one of carbon, lithium titanate, lithium cobalt oxide, lithium manganese oxide, lithium nickel manganese cobalt oxide, lithium nickel cobalt aluminum oxide, lithium iron phosphate, or lithium iron manganese phosphate.

In a preferred embodiment, the charge is applied to the conductive particles by a corona gun or by triboelectric charging. Preferably, the binder is selected from the group comprising PVDF, PTFE and SBR. Preferably, mixing the conductive particles with binder comprises a co-aerosolization.

In a preferred embodiment, applying the mixture to the film comprises a reel-to-reel deposition system wherein particles are deposited in multiple streams. The film is preferably applied to a roll of substrate in a continuous process. Preferably, the conductive particles are mixed with a binder by at least one of co-aerosolizing the binder as a dry powder using a turntable dust generator or fluidized bed disperser; dissolving the binder in a solvent, atomizing the dissolved binder into microdroplets, and mixed with the particles as an aerosol; or vaporizing the binder and allowing the vaporized binder to condense on the particles.

Another embodiment of the invention is directed to a system for forming a conductive particle film. The system comprises a mixer to combine conductive particles with a binder to form a mixture, an aerosolizer to aerosolize the mixture, an electrical charging device to charge the aerosol mixture, a heating device to heat a substrate, and a grounding device to ground the substrate. The film is applied to the substrate in a continuous process.

In a preferred embodiment, the substrate is a metal foil heated above the melting point of the binder and the heating device is a resistive, convective, or radiant heating device. Preferably, the conductive particles comprise anodic or cathodic material. Preferably, the anodic or cathodic material comprises at least one of carbon, lithium titanate, lithium cobalt oxide, lithium manganese oxide, lithium nickel manganese cobalt oxide, lithium nickel cobalt aluminum oxide, lithium iron phosphate, or lithium iron manganese phosphate.

In a preferred embodiment, the electrical charging device is at least one of a corona gun or by triboelectric charging. The binder is preferably selected from the group comprising PVDF, PTFE and SBR. Preferably, mixing the conductive particles with binder comprises a co-aerosolization. The system preferably further comprises a reel-to-reel deposition system wherein particles are deposited in multiple streams. In a preferred embodiment, the mixer at least one of co-aerosolizes the binder as a dry powder using a turntable dust generator or fluidized bed disperser; dissolves the binder in a solvent, atomizes the dissolved binder into microdroplets, and mixes with the particles as an aerosol; or vaporizes the binder and allows the vaporized binder to condense on the particles.

Other embodiments and advantages of the invention are set forth in part in the description, which follows, and in part, may be obvious from this description, or may be learned from the practice of the invention.

DESCRIPTION OF THE INVENTION

Figure 1:
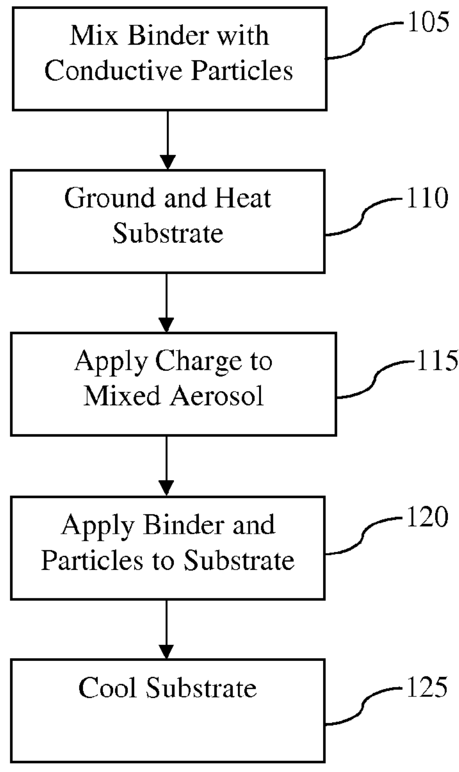
FIG. 1 An embodiment of a method of the invention.

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Conventional particle film deposition methodology has focused on automation to increase yields. Reduced yield and also batch-to-batch variations remain a bane to the lithium ion battery industry. It has been surprisingly discovered that yield can be increased and batch-to-batch variation minimized by the methodologies of the invention, and in particular, by co-aerosolization of a conductive particle and a binder. The conductive particles and binder are preferably aerosolized separately and mixed together in the aerosol phase prior to deposition. The process of the invention is not limited to battery chemistry, nor is the chemistry limited to the deposition process. Powder aerosolization can be combined with electrostatic powder deposition to produce nearly any particle film. Accordingly, the processes of the invention can be utilized in a wide variety products and methods that relate to particle deposition.

Particle deposition involves an application of particles to a surface. Particles are preferably nanoparticles, which are nanometers to tens of microns in grain size, or nanoparticle agglomerates. Reel-to-reel film deposition allows for the potential of in-situ battery assembly, so that coated electrodes may be prepared and assembled in the same controlled atmosphere. The resulting automated large-area deposition also facilitates the reliable production of large high-current, single-cells.

Electrostatic powder coating (EPC) was first developed in the 1950's as a means for creating uniform large-area particle films. The process has only been commercialized on a more widespread basis over the last two decades (A. G. Bailey, J. Electrostatics 45: 85-120, 1998). The basic principle is to charge aerosolized particles, either by a corona gun or by friction caused by flow of the particles through a TEFLON® tube, and to aerodynamically carry and deposit the charged particles on a surface. The surface preferably is electrically grounded or has an opposite charge to the charge of the particles, so that the particles follow electric field lines to the surface where they remain adhered due to the electrostatic attractive forces between the particle and surface. Preferably, the surface is a metal capable of conducting a charge, however the surface can be of another material, such as plastic, fiber, or other naturally occurring or manmade materials capable of conducting a charge. Current applications of the process are generally followed by a high temperature melting and curing step, forming the final continuous film. Constraints on the size and electrical properties of the particles have previously limited the industrial use of the process to environmentally friendly (e.g., no solvents) painting and epoxy coating.

The conventional constraints on the particle properties preclude the application of EPC to nano-sized particles and to particles that are either too conductive or too electrically resistive. There are resistivity limits because of the required electrostatic adhesive interaction between the particle and surface after deposition has occurred. While paint particles typically used in EPC stick to the substrate via electrostatic charges, conductive particles alone will not stick to the substrate due to the rapid loss of charge when the particles come into contact with the grounded substrate. Particles that are too conductive immediately lose their charge to the surface, and are therefore no longer electrostatically bound to the surface. They are then susceptible to aerodynamic re-entrainment in the carrier gas flow. Conversely, particles that are too resistive retain their charge to such an extent that the coated surface itself becomes highly charged. This results in: 1) a significant reduction in the magnitude of the electric field attracting the particles to the surface, and 2) a so-called back ionization effect, whereby electrical gas breakdown occurs within the particle film resulting in a local loss of charge, localized re-entrainment of particles, and thus a non-uniform or "orange peel" finish. One example of an EPC process used in battery making is U.S. Pat. No. 6,511,517 to Ullrich et al. However, the method taught by Ullrich uses EPC merely to create a wax coating on top of the positive electrode or the negative electrode.

The application of EPC to conductive nanoparticle films, such as a graphitic carbon anode or a conductive lithium iron phosphate (typically coated with carbon) cathode, involves film that is bound to a metal sheeting substrate immediately upon deposition. Conventional slurry coating of lithium ion battery electrodes typically employs a polyvinylidene fluoride (PVDF) binder for adequate film adhesion. The necessary presence of such a chemically inert binder may be exploited to enhance the immediate adhesion of the film to the substrate.

FIG. 1 depicts a flowchart of an embodiment of a method of the invention. At step 105, preferably a binder is mixed with electrically conductive cathode/anode particles in the aerosol phase. At step 110, heat is applied to the substrate and the substrate is electrically grounded. Preferably, the heat is above the melting point of the binder. At step 115, the mixture of the binder and conductive particles is electrically charged. At step 120, the binder is co-deposited with the cathode/anode particles in a well-mixed fashion. The heated substrate induces sufficient flow of the PVDF to bind the film, despite the rapid loss of charge of the conductive particles, to the grounded substrate. At step 125, the substrate is allowed to cool with the charged particles adhered thereto. The method shown in FIG. 1 can be carried out either for a single sided coating, as shown in FIG. 4, or for a double sided coating, as shown in FIG. 5

The anodic or cathodic material is preferably at least one of carbon, lithium titanate, lithium cobalt oxide, lithium manganese oxide, lithium nickel manganese cobalt oxide, lithium nickel cobalt aluminum oxide, lithium iron phosphate, or lithium iron manganese phosphate. Additional suitable polymer binders include styrene butadiene copolymer (SBR), polytetrafluoroethylene (PTFE) and others which are well-known in the art. Preferably, the binder is non-soluble. A secondary benefit to this mode of EPC deposition is that static charge build-up of insulating film particles is avoided, thus eliminating the self-limiting effects of back ionization. In other words, the film could be grown arbitrarily thick, as compared to conventional EPC applications.

Mixing the binder with the cathode or anode powder in the aerosol phase can be performed in variety of ways. For example, binder can be co-aerosolized as dry powder using a turntable dust generator (S. Seshadri et al., J. Aerosol Sci. 36: 541-547, 2006) or fluidized bed disperser. Alternatively, the binder can be dissolved in a solvent and atomized into microdroplets and mixed with the active powder as an aerosol. Finally, the binder can be vaporized and allowed to condense on the cathode/anode powder grains.

Figure 4:
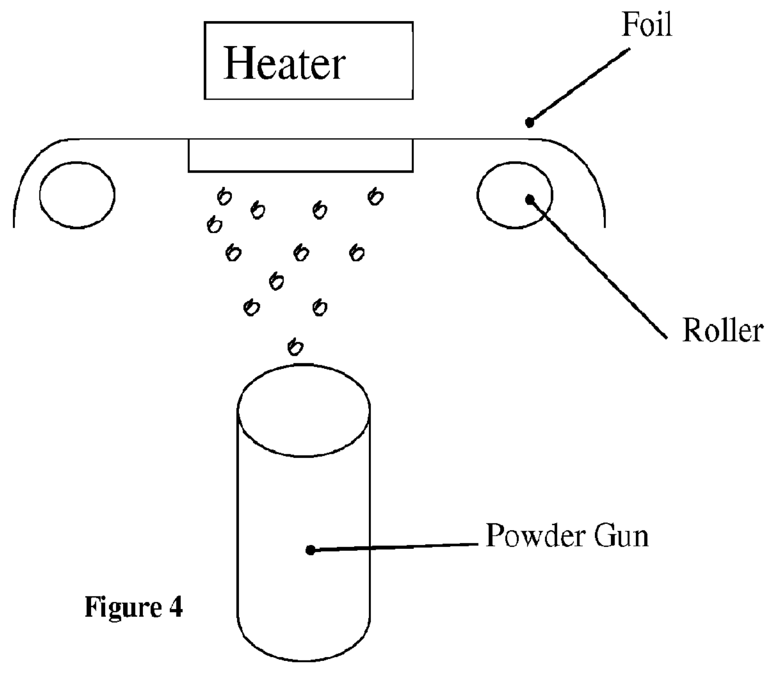
FIG. 4 Depicts an embodiment of single sided coating.
Figure 5:
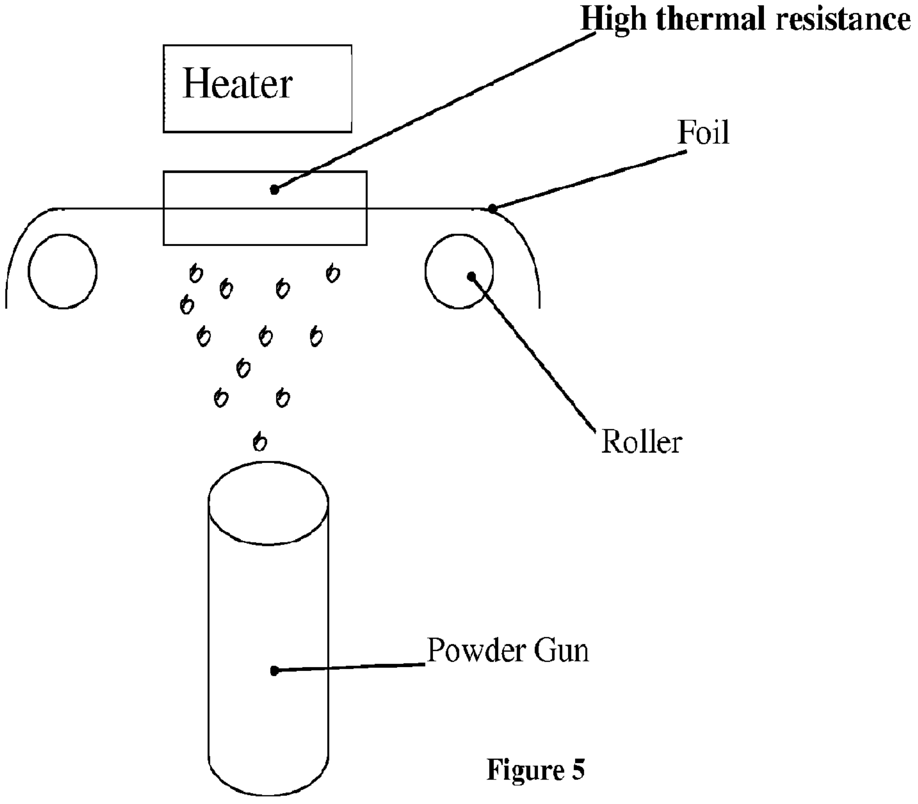
FIG. 5 Depicts an embodiment of double sided coating.

When coating a thin metal foil using either the system shown in FIG. 4 or FIG. 5, convective and radiative heating have proven ineffective because, due to the small specific heat of thin foils, significant cooling begins immediately. This large temperature gradient results in non-uniform deposition and requires the foil be heated significantly above the melting point of the binder so that it doesn't cool below the melting point in the deposition area. This cooling is significantly increased by convection from the air flow required to move the powder onto the foil. The cooling can be partially mitigated by having the heater directly opposite the deposition area, however it is impractical to do this with a double-sided coating, as shown in FIG. 5. A double sided coating will have a layer of deposited powder between the heater and the foil which acts as a thermal barrier. This again requires temperatures much higher than the melting point of the binder resulting in non-uniformity and potentially damaging the coating.

Figure 6:
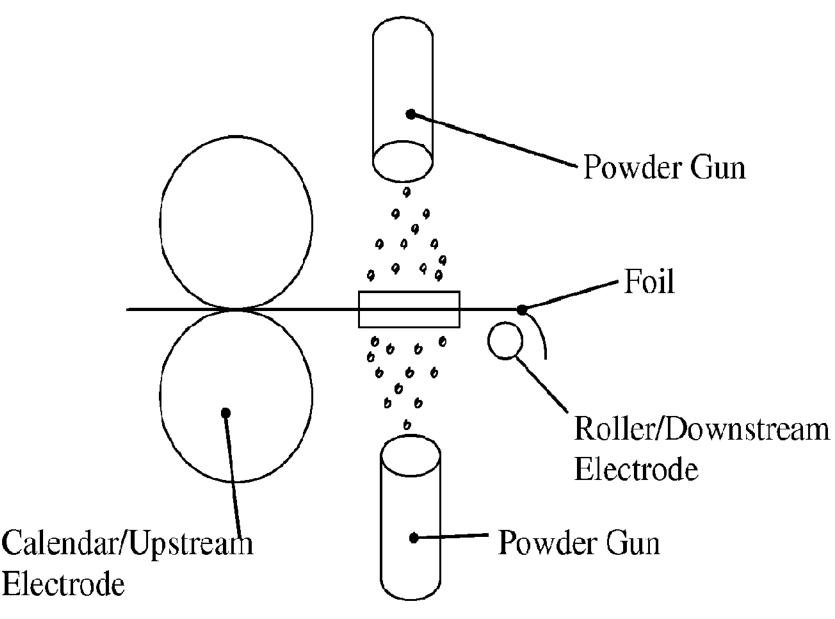
FIG. 6 Depicts another embodiment of double sided coating.

For thin foils, preferably, the foil is resistively heated during powder deposition by passing an electrical current (either AC or DC) directly through the metal foil substrate during reel-to-reel deposition. Using this method, heat is preferably generated continuously and uniformly throughout the foil, from below the coating. This preferably results in a small temperature gradient that allows for highly uniform coatings. A continuous reel-to-reel coating system is depicted in FIG. 6. The roller on the pre-deposition (uncoated) side preferably serves as one electrode. The post deposition side passes current through the deposited powder that may have high contact resistance. To solve this, after deposition, the foil is preferably immediately passed through a calendaring press. The calendaring rollers preferably serve as the second electrode with the contact resistance being reduced by the high pressure contact. Preferably, the electrical current passes into and out of the metal rollers using a series of conductive brushes or conductive bearings. The system depicted in FIG. 6 has the added benefit of ensuring a conductive path between the powder and the foil, which is important for battery coating applications.

Figure 7:
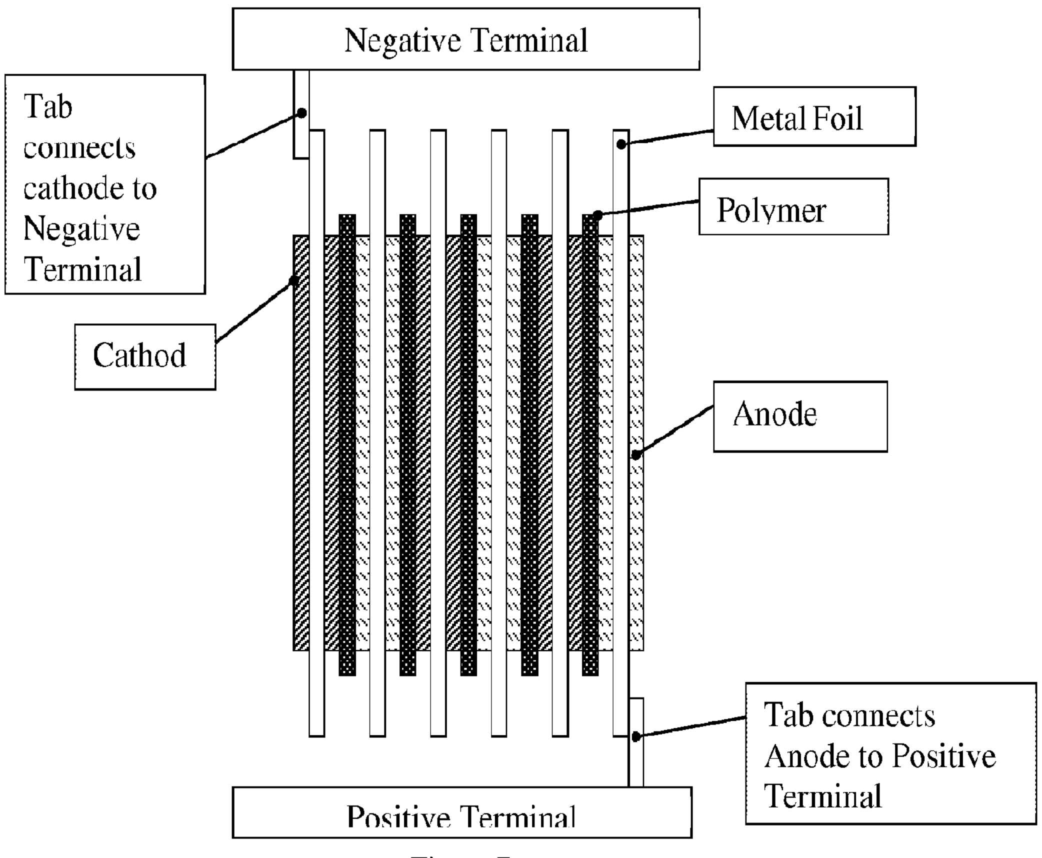
FIG. 7 Depicts a cross section of standard lithium ion cylindrical cell.
Figure 8:
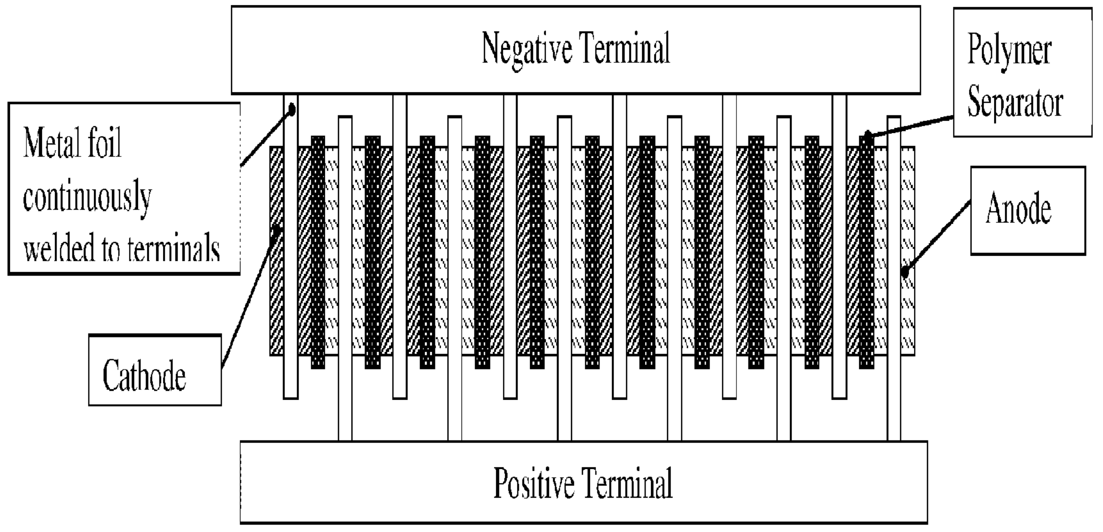
FIG. 8 Depicts an embodiment of an inventive lithium ion battery.

The foils created by the system depicted in FIG. 6 are preferably adapted for use in lithium ion batteries. The foils can be used in traditional lithium ion batteries, for example the battery depicted in FIG. 7, or batteries adapted to dissipate heat at a faster rate than traditional batteries. A battery adapted to quickly dissipate heat preferably increases heat transfer out of the cell by welding metal foils to the battery terminals along their entire length, for example as depicted in FIG. 8. Preferably, the battery consists of a cathode, an anode, and polymer separator. Preferably, the metal foils act as both the cathode and the anode and are created by the systems and methods described herein. However other cathodes and anodes can be used. For example the cathode and/or anode can be made of carbon, graphite, metal oxide, a layered oxide, lithium cobalt oxide, a polyanion, lithium iron phosphate, a spinel, lithium manganese oxide, or another material. The polymer separator can be, for example polyethylene or polypropylene. In other embodiments an electrolyte can separate the cathode from the anode.

Preferably, the battery design allows heat to flow out through the most thermally conductive part of the battery. In order increase heat dissipation even more, preferably, the shape of the cell is changed from a narrow cylinder to a wide, thin disk. Preferably, the diameter cylinder exceeds the length of the cylinder. Preferably, the ratio of the diameter to the length is greater than 5 to 1, greater that 6 to 1, or greater than 7 to 1. Preferably the cathode, anode, and polymer separator are arranged in a spiral configuration so that many layers of cathode/anode interaction can occur in the same battery. For example, the cross-section of the battery depicted in FIG. 8 displays six winds of each the cathode and the anode with eleven polymer separator layers. Preferably, the anode and cathode are formed simultaneously and immediately wound into a battery.

The thin disk shape of the pancake-like cell, combined with continuous terminal welding, preferably allows heat to transfer a short distance to easily cooled, high surface area terminals. This cell design is preferably advantageous over standard battery designs in that individual cells can be safely made to much higher capacities than the standard designs. This may provide significant manufacturing cost reduction, especially when combined with a continuous single step production technique.

The following examples illustrate embodiments of the invention, but should not be viewed as limiting the scope of the invention.

EXAMPLES

Figure 2:
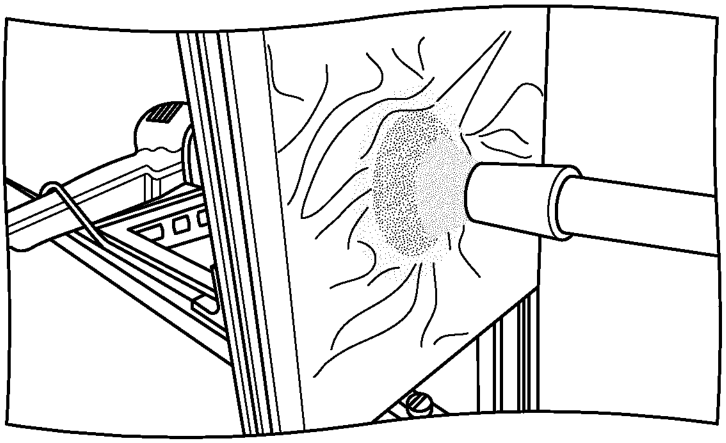
FIG. 2 An embodiment of the mixed binder and charged particles being applied to the substrate.

As an example of the process, Carbon Black nanopowder was mixed with PVDF powder in a 10:1 carbon-to-binder mass ratio mixture and deposited on an aluminum foil substrate. The mixture was placed in a 5 lb fluidized bed hopper and fluidized using a vibrating element attached to the hopper. A venturi pump was used to deliver the fluidized powder from the hopper to a corona gun set at a voltage of 50 kV and positioned 1.5 inches away from foil substrate. The backside of the foil was heated convectively using a heat gun such that the front side of the foil was measured to exceed 200 C—above the melting point of PVDF. Within 1 second, a thick powder film was formed on the foil substrate in a circular pattern indicative of the radial temperature distribution on the foil, as shown in FIG. 2. The powder did not stick in the region of the foil where the temperature was below the PVDF melting point. In tests that did not include heating of the substrate, the film did not stick to the foil at all.

Figure 3:
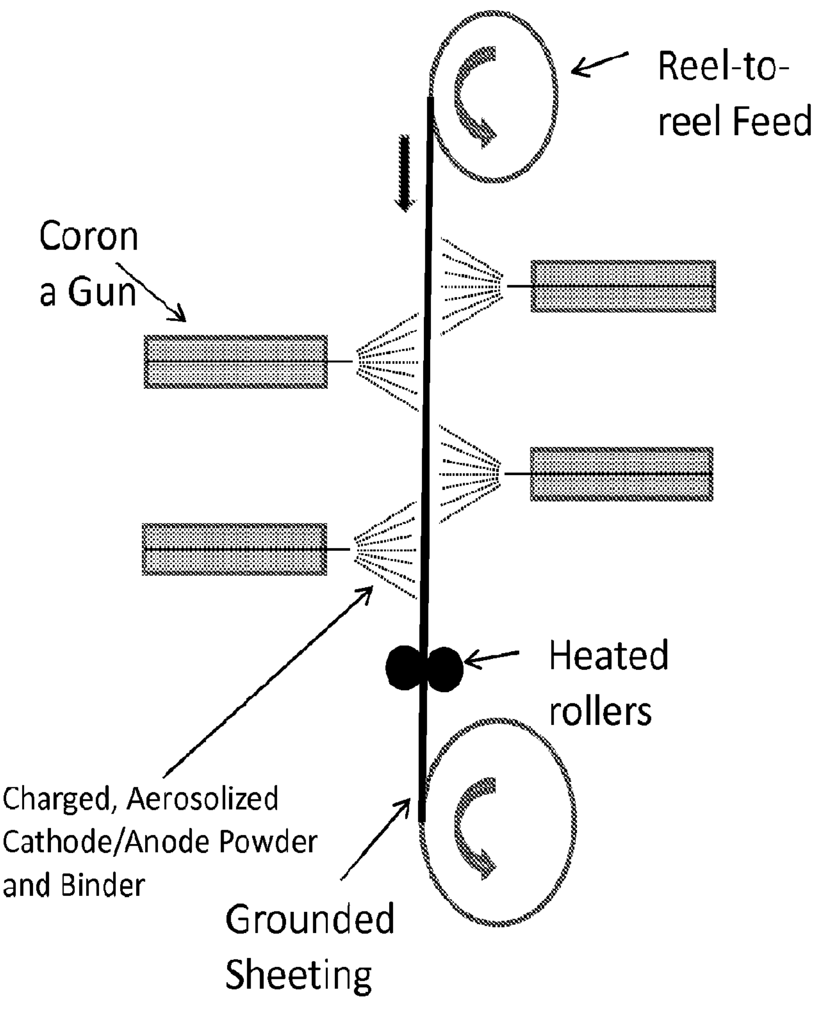
FIG. 3A schematic of one embodiment of the process of the invention.

The deposition process shown schematically in FIG. 3 comprises a series of corona guns, staggered to optimize film thickness uniformity, oriented on both sides of a slowly translating grounded substrate (copper or aluminum for the anode or cathode, respectively). The substrate is preferably slightly heated to induce binder flow, and passed through a set of hot rollers that further induce melting and improve film uniformity. The sheeting is collected on a roll, again as shown in FIG. 3, or can be combined in-situ and rolled into a single-cell battery. A 10 kWh lithium iron phosphate battery cell deposited on 50 cm wide sheeting would require a total sheeting length of 120 m. This could be rolled into a cylinder having a diameter of roughly 17 cm. Such a cell requires a reel-to-reel process, and could not be formed using conventional batch processes.

Prior to deposition, the cathode and anode powders are preferably aerosolized and delivered to the corona guns with a high mass throughput and at a steady rate. Aerosolization of dry powders is a common industrial process that may be accomplished efficiently using a variety of processes. For example, high mass loadings, resulting in the flow of several grams of powder per second per corona gun, is achieved through fluidized bed dispersion, wherein a carrier gas flows though a powder hopper inducing enough shear to break particle-particle adhesive bonds and resulting in their entrainment in the gas flow. This type of powder dispersion works well for grain sizes on the order of tens of microns. Nanometer-scale grains preferably involve a superimposed mechanical agitation for their effective entrainment as agglomerates. This agitation is preferably imposed by sound waves (C. Zhu et al., Powder Tech. 141: 119-123, 2004), vibrations, or centrifuging (S. Matsuda et al., AICHE J. 50: 2763-2771, 2004). Aerosolization of individual grains is not necessary and, in fact, may be detrimental to the deposition process. Optimum agglomerate size is preferably determined by varying the agitation frequency and the flow rate.

The proposed single-step deposition technique can be integrated into a fully automated battery manufacturing methodology. The system would limit the potential for film contamination, reduce batch-to-batch variations, and ultimately increase product yield. This in turn would significantly reduce retail costs to levels that would enable the widespread deployment of large batteries for residential usage.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

The invention claimed is:

1. A method for forming a conductive particle film, the method comprising:
- spraying a mixture of conductive particles and a binder toward a substrate;
- electrically contacting an uncoated section of the substrate using a first electrode;
- electrically contacting a coated section of the substrate through the conductive particle film using a second electrode; and
- generating heat in the substrate between the uncoated section and the coated section of the substrate by passing current between the first and second electrodes.

2. The method of claim 1, further comprising moving the substrate using a first roller and a second roller, wherein moving the substrate includes moving at least a portion of the substrate in a direction from the first electrode toward the second electrode while the mixture is sprayed toward the substrate.

3. The method of claim 2, wherein moving the substrate includes unwinding the substrate from the first roller and winding the substrate onto the second roller.

4. The method of claim 1, wherein one or both steps of electrically contacting the uncoated section and electrically contacting the coated section includes electrically contacting the substrate with one or more rollers.

5. The method of claim 4, wherein electrically contacting the substrate with one or more rollers includes electrically contacting the substrate using at least one of conductive brushes and conductive bearings in electrical contact with the one or more rollers.

6. The method of claim 4, further comprising calendering the conductive particle film using at least one of the one or more rollers.

7. The method of claim 6, wherein passing current between the first electrode and the second electrode includes passing current through the calendered conductive particle film from the first electrode to the second electrode.

8. The method of claim 1, wherein the substrate is a metal foil.

9. The method of claim 1, wherein spraying the mixture includes aerosolizing the mixture and electrically charging the mixture.

10. The method of claim 1, further comprising combining the conductive particles with the binder to form the mixture.

11. The method of claim 1, further comprising spraying a polymer powder onto the conductive particle film to form a separator.

12. The method of claim 1, wherein both steps of electrically contacting the uncoated section and the coated section includes electrically contacting the substrate using rollers.

13. The method of claim 1, wherein the conductive particles comprise an anodic or cathodic material.

14. The method of claim 13, wherein the anodic or cathodic material comprises at least one of carbon, lithium titanate, lithium cobalt oxide, lithium manganese oxide, lithium nickel manganese cobalt oxide, lithium nickel cobalt aluminum oxide, lithium iron phosphate, and lithium iron manganese phosphate.

15. The method of claim 13, wherein the binder comprises one or more of polyvinylidene fluoride (PVDF), polytetrafluoroethylene (PTFE), and styrene butadiene copolymer (SBR).

* * * * *